April 30, 1940.  J. B. HAYES  2,198,614
EMULSIFIER
Filed Feb. 8, 1937  2 Sheets-Sheet 2
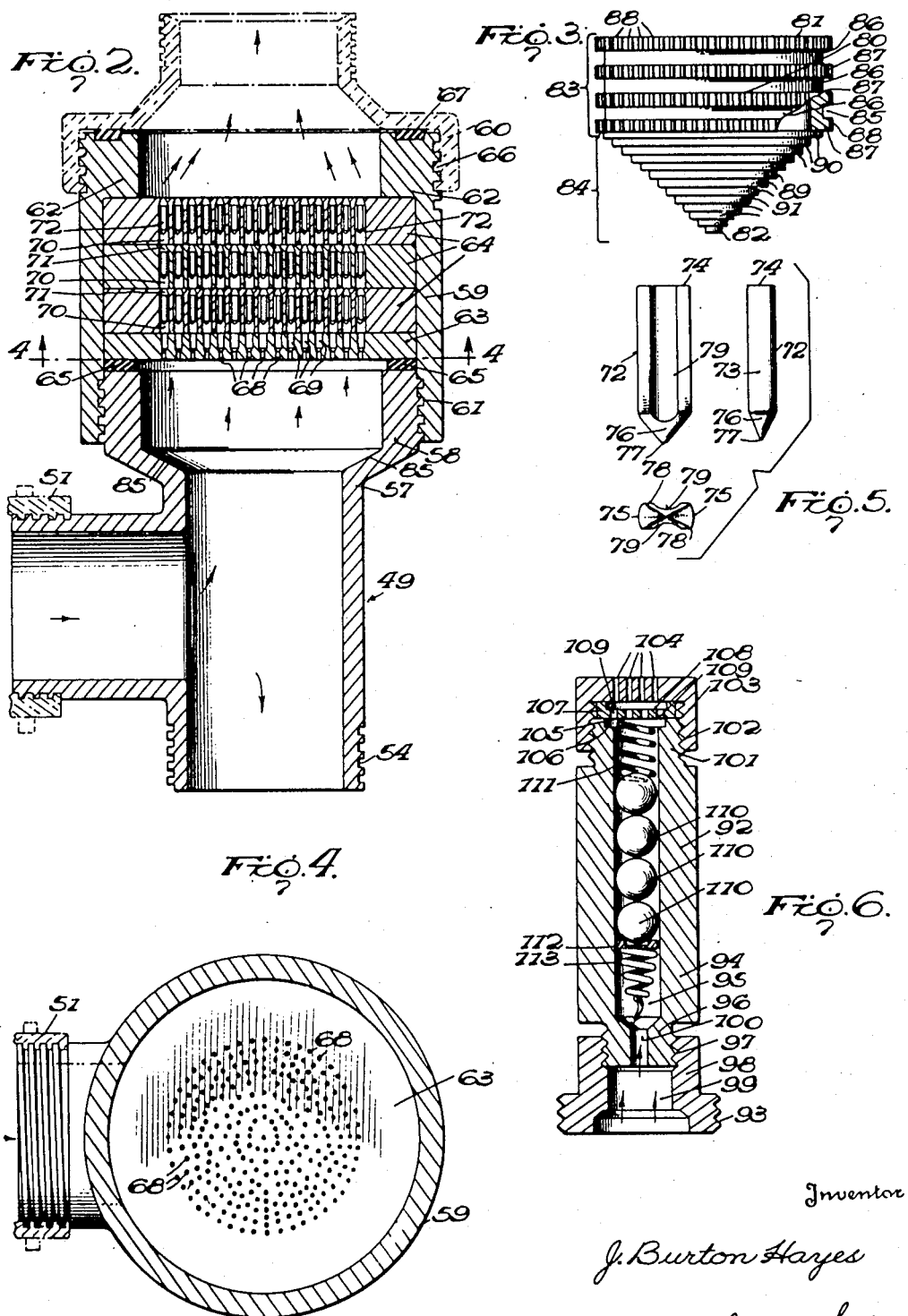
Inventor
J. Burton Hayes
By Cameron, Kerkam & Sutton
Attorneys Patented Apr. 30, 1940

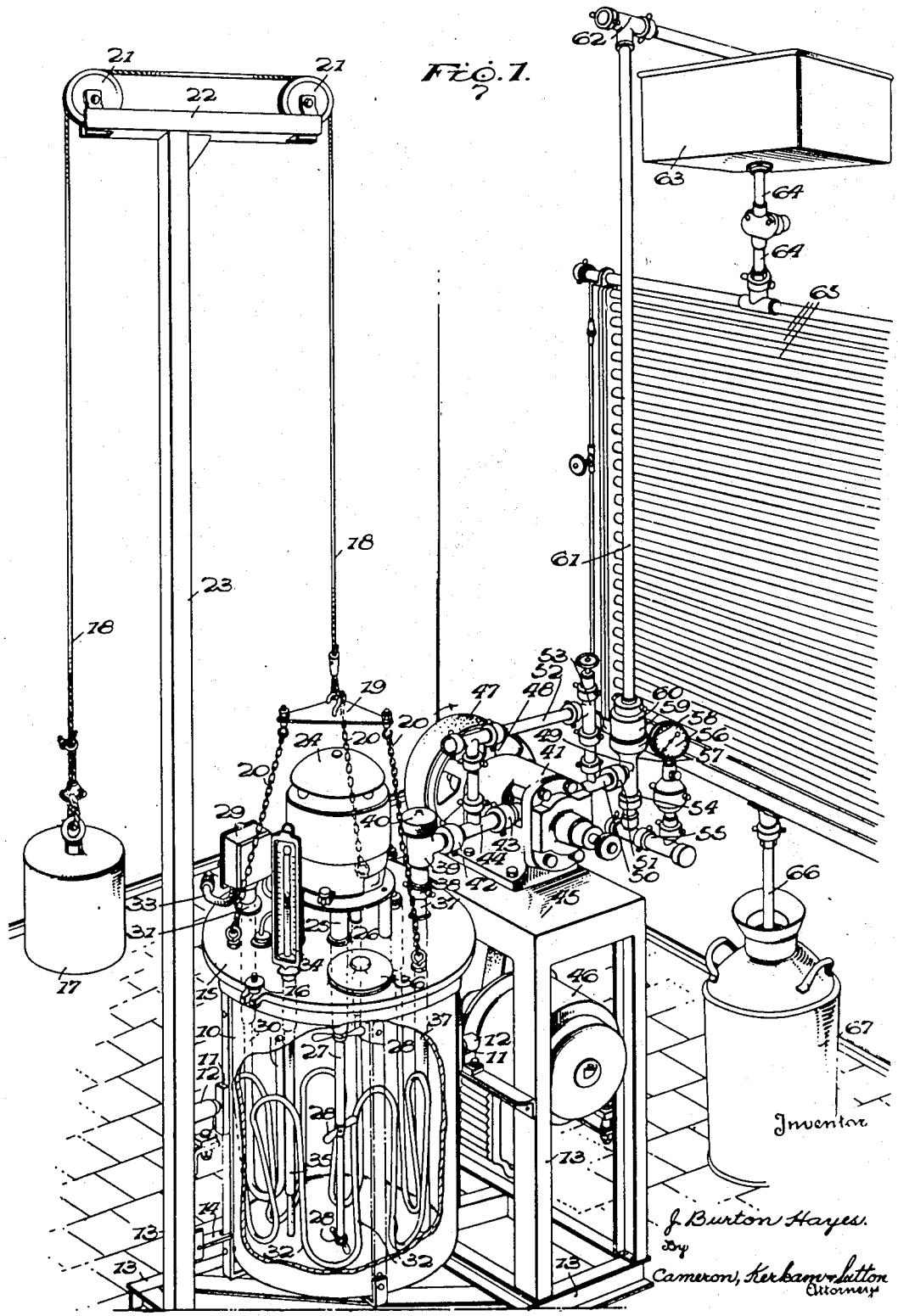

2,198,614

UNITED STATES PATENT OFFICE 2,198,614

EMULSIFIER

James Burton Hayes, Urbana, Ill.

Application February 8, 1937, Serial No. 124,750

2 Claims. (Cl. 99—265)

This invention relates to an emulsor and more particularly to an emulsor producing a uniform controlled particle size in the constituents of the emulsion. Even more particularly this invention relates to an emulsor for use in the reconstruction of milk and cream products from the separated and, in some instances, desiccated components of whole milk.

Many methods are known for separating whole milk into its component parts of fats, salts and water. When so separated the fats may be churned to produce butter and the balance of the whole milk, or skimmed milk as it is called, may be desiccated by any of known processes to obtain powdered milk. The ingredients of whole milk in the form of butter and powdered milk keep better than the whole milk and occupy less storage space as the water of the whole milk is removed. It is well known that butter fats in the form of butter sell at prices below those of butter fats in the form of cream and that skimmed milk in the powdered form sells at prices below those of liquid milk. It is therefore apparent that if a means be had to reconstruct cream and milk products from butter and skimmed milk powder a substantial savings will result.

The utility of a means for reconstructing milk products from butter and milk powder is not only found in the saving that results as against the purchase of cream and milk on the market but also in the control to be had over the percentages of the ingredients in the reconstructed product. For instance, cereal cream should contain 12% to 15% butter fat while coffee cream is most satisfactory when it contains from 20% to 22% butter fat. Any butter fat in the product designed for these uses over these percentages is waste. By varying the amounts of butter used in the reconstruction the percentage of butter fat in the product may be controlled and a substantial savings had. Further such a means for reconstructing milk and cream would be of the utmost utility in cases where a patient of known fat tolerances is under treatment. By proper variation of the percentages of the butter and powdered milk used a product could be produced to meet these tolerances.

Many dairies and ice cream plants as well as other users of large quantities of milk and cream customarily homogenize their milk and cream to give it a uniform particle size with resulting benefits as is well known to the art. It is therefore apparent that it would be of the greatest advantage and importance to provide a means in the reconstruction of milk products from butter and milk powder for homogenizing the reconstructed product to obtain a uniform controlled size of particle.

All communities now require milk and cream to be pasteurized before sale and most require pasteurization of butter fats before making butter. It is therefore apparent that means for pasteurizing the butter and powdered milk before reconstruction would be of the greatest utility and importance when incorporated with the means utilized in the reconstruction. It is further apparent that this pasteurization must be closely controlled to eliminate any scorching of the butter-powdered milk mix before reconstruction.

I have found that milk and cream products may be reconstructed from a mix of proper proportions of butter, skimmed milk powder and water by subjecting the mix to pasteurizing temperatures and then passing the mix under uniform pressures up to 700 lbs. per square inch through a plurality of small passages to a series of baffles, the size and homogeneity of the particles in the reconstructed product being accurately controlled by appropriate variation of the pressure and the number of baffles.

It is accordingly an object of this invention to provide an emulsor which will regulate and control the size of the particles in an emulsion to give particles of desired uniform size.

Another object of this invention is to provide an emulsor which may be used in the reconstruction of milk products from the separated components of whole milk.

Another object of this invention is to provide an emulsor which may be used in the reconstruction of milk products from the separated components of whole milk to produce milk products substantially identical in character with the whole milk.

Another object of this invention is to provide an emulsor which may be used in the reconstruction of milk products from butter and powdered milk in which the percentages of fats and salts used may be controlled.

Another object of this invention is to provide an emulsor for the reconstruction of milk products from butter and powdered milk by which the particle size in the emulsion may be regulated.

Another object of this invention is to provide an emulsor for the reconstruction of milk products from butter and powdered milk which will produce a uniform particle size in the emulsion.

Another object of this invention is to provide an emulsor for the reconstruction of milk products from butter, powdered milk and water which will pasteurize the butter-powdered milk-water mix before reconstruction.

Another object of this invention is to provide an emulsor for the reconstruction of milk products from butter, powdered milk and water which will pasteurize the butter-powdered milk-water mix before reconstruction by direct heating with an electric coil.

A further object of this invention is to provide an emulsor which reconstructs milk products from butter, powdered milk and water by finely dividing the mix of butter, powdered milk and water while under pressure.

A further object of this invention is to provide an emulsor which reconstructs milk products from butter, powdered milk and water by forcing the mix of butter, powdered milk and water through a plurality of small jets while subjected to a uniform pressure.

A still further object of this invention is to provide an emulsor which is readily dismounted for cleaning and sterilizing.

A further object of this invention is to provide an emulsor which is compact, simple in design, uniform in operation, and has a minimum of movable parts.

Other and further objects of this invention will appear as the description proceeds.

While this invention is capable of many uses and embodiments it will be described with particular reference to its use in the reconstruction of milk products. Description of the invention for this use should not be construed as a limitation of the scope of the present invention and reference should be had to the appended claims for this purpose.

In the accompanying drawings:

Fig. 1 is a view of one embodiment of my novel emulsor showing the relative positions of the several parts, the mixing tank being cut away to show the position of the heating coils, mixer and heat controls therein;

Fig. 2 is a cross sectional elevation of one embodiment of my novel jet block showing the relative positions of jets and rotor baffles;

Fig. 3 is a view partly in section of one embodiment of my novel preliminary breaker which may be used in conjunction with the embodiment of the jet block shown in Fig. 2;

Fig. 4 is a cross section taken along the line 4—4 of Fig. 2 showing the position of the several jets;

Fig. 5 is a detailed showing of one embodiment of my novel rotors used in the baffles; and Fig. 6 is a cross sectional elevation of another embodiment of my novel jets that may be used in place of the jets and rotor baffles of Fig. 2.

With reference to the several figures in which like reference characters indicate like parts and more particularly with reference to Fig. 1, 10 is a mixing tank of any suitable size and construction and made of any suitable material and lined wth glass if desired. Carried by the sides of tank 10 are trunnions 11 received by trunnion caps 12 which are mounted on any suitable frame 13 to allow tank 10 to be tilted for emptying and cleaning. Associated with frame 13 is a latch 14 designed to hold tank 10 in an upright position until released. A cover 15 is carried by tank 10 and is secured to tank 10 by a plurality of lock bolts 16 forming an air tight joint with tank 10. Cover 15 is designed to be easily removed from tank 10 and to this end a counterweight 17 is provided. Counterweight 17 is joined to cover 15 by a flexible cable 18 secured to counterweight 17 and to the center of a triangular plate 19 which is in turn connected at its three corners to cover 10 by chains 20. Cable 18 passes over rollers 21 carried by a cross bar 22 which is mounted on a vertical extension 23 of the frame 13 to give the necessary counterweight action.

Mounted in the center of cover 15 is an electric motor 24 of any suitable horse power and responsive to direct or alternating current as the local conditions may dictate. Shaft 25 of motor 24 passes through cover 15. Mounted on an extension 27 of shaft 25 are three agitators 28 which are angularly displaced one with respect to the other and may vary in number and size with the size of tank 10. Agitators 28 are designed to force the mixture in the center of tank 10 in a downward direction and to force the mixture upward along the sides of tank 10. A temperature responsive thermostatic switch 29 of any suitable design and construction is mounted adjacent motor 24 on cover 15. Thermostatic switch 29 is actuated by temperature responsive fluids or gases contained in a U tube 30 which is in communication with thermostatic switch 29 and located within the tank 10. Tube 30 passes through cover 15 and is carried thereby forming an air-tight seal with cover 15 through the medium of any suitable packing 31.

Carried by cover 15 and arranged near the walls of tank 10 are heating coils 32 designed to heat the circulating mix to pasteurization temperatures. The number and size of these coils depend upon the size of tank 10. Preferably these coils consist of a tube of suitable heat conducting metal within which is carried the heating filament packed in magnesium oxide. The areas of the surfaces of the tubes are chosen with consideration to the amount of heat radiated from the walls of tank 10 and to the rate of circulation of the mix so that the temperature of the coil is never greater than 15° F. above that of the mix and burning of the mix is prevented. With this type of heating coil about one-half an hour is required to raise the mix to pasteurizing temperatures in the neighborhood of 145° F. Further with this type of heating coil as determined by the rate of circulation of the mix and the radiation from the walls of the tank a substantially equal temperature is maintained at all times throughout the body of the mix with variations in temperature not exceeding .2° F. The electrical leads of the heating coils 32 are led to thermostatic switch 29. Electric current to supply motor 24 and heating coils 32 is brought from any suitable source of supply by a conduit 33.

A thermometer 34 of any desired size and construction is carried by cover 15, the thermometer tube 35 passing through cover 15 and down into tank 10 terminating adjacent the bottom of tank 10. Tube 35 forms an air-tight joint with cover 15.

Any suitable filling and inspection hole is let into cover 15 and when not in use is closed by a cap 36 which forms an air-tight seal with cover 15.

Carried by and passing through cover 15 and forming an air-tight joint therewith is a pipe 37 which terminates adjacent the bottom of tank 10. Pipe 37 is designed to remove the mix from tank 10 after mixing and pasteurization. Connected to the upper end of pipe 37 as by any suitable air-tight and readily dismountable joint 38 is a T-shaped coupling 39 closed at one end by a removable cap 40, and designed to carry any suitable filtering means. The outlet of coupling 39 is connected to the intake of any suitable type of pump 41 through dismountable joints 42 and 43 and pipe 44. Pump 41 must be readily disassembled for cleaning and sterilizing purposes. Pump 41 is mounted on any suitable portion 45 of frame 13 and is driven by any suitable motor 46 supplied with current from any suitable source mounted on frame 13 through the medium of any suitable belt 47 and pulley 48. The exhaust port of pump 41 is connected to a T-shaped coupling 49 by a pipe 50 and dismountable joint 51. Any suitable readily dismountable by-pass assembly 52 is provided between pipes 44 and 50 including an adjustable pressure responsive valve 53 of any suitable construction to insure a constant pressure at the exhaust port of pump 41 which may be varied in amplitude by proper adjustment of valve 53.

One end 54 of coupling 49 is connected by any suitable dismountable pipe and joint assembly 55 to a pressure responsive gauge 56. The other end 57 of coupling 49 is chambered as at 58 to form one end of the jet block housing. A sleeve member 59 engages chambered portion 58 to form the walls of the jet block housing. A cap 60 engages the other end of sleeve 59 to form the opposite end of the jet block housing. From cap 60 a pipe 61 leads through a dismountable joint 62 to a tank 63. From tank 63 a pipe 64 leads to any suitable cooling coils 65 which discharge through pipe 66 into any suitable container 67.

With more particular reference to Fig. 2, 49 is a T-shaped coupling, as above described, connected to the exhaust port of pump 41 through the joint 51. End 54 of coupling 49 leads to a pressure responsive gauge 56 as described. The opposite end 57 of coupling 49 is chambered at 58 to form one end of the jet block housing. Engaging chamber 58 as by threads 61 is a sleeve member 59 formed with an annular shoulder 62 at its upper end. Mounted within sleeve member 59 and supported between chamber 58 and shoulder 62 is a jet plate 63 and a plurality of baffle plates 64. Interposed between jet plate 63 and the end of chamber 58 is a gasket 65 to insure a fluid-tight joint between chamber 58 and sleeve member 59 and to act to firmly engage the several baffle plates and the jet plate one with the other when sleeve member 59 is screwed down on chamber 58. Cap 60 engages sleeve member 59 through threaded portion 66, a gasket 67 acting to insure a fluid-tight joint between cap 60 and sleeve member 59.

With reference to Figs. 2 and 4, jet plate 63 comprises a plurality of small holes 68 arranged concentrically around the center of the jet plate 63, the number of these holes depending upon the amount of the mix it is desired to pass in a given period of time. Holes 68 are enlarged as at 69 to provide an explosion chamber for each of holes 68.

The number of baffle plates 64 used is determined by the particle size desired and the pressure utilized. The greater the number of baffle plates and the higher the pressure, the smaller the size of the particles. Each baffle plate 64 comprises a plurality of passages 70, the center of each passage 70 being aligned with the center of the corresponding set of holes 68 and 69 in jet plate 63. Each passage 70 is tapered at its outlet end as at 71. Tapered portion 71 may be used to provide a bearing for baffle rotors 72 which may be used in conjunction with baffle plates 64 if desired, one rotor being located in each passage 70. Each of baffle rotors 72 (see Fig. 5) comprises an oblong bar 73 of suitable material square at one end 74 and rounded across the smaller sides 75 to fit the curve of passages 70. The opposite end 76 of rotor 72 is pointed as at 77, point 77 falling in the axis of rotation of rotor 72. The larger sides 78 of rotor 72 are hollowed out as at 79 to form a trough extending from adjacent point 77 of end 76 down the length of rotor 72 to end 74. Rotors 72 are placed in passages 70 so that squared ends 74 engage the bearings formed by tapered portion 71 of passages 70.

Fig. 3 discloses a preliminary breaker 80 which may be used in conjunction with the jet plate 63 and baffle plates 64 as above described with reference to Fig. 2. Breaker 80 is designed to fit within the chamber 58 with its base 81 adjacent jet plate 63 and its point 82 extending into coupling 49. Breaker 80 comprises a cylindrical base portion 83 of diameter equal to that of chamber 58 adjacent jet plate 63 and a conical head 84 designed to engage the sloping walls 85 of chamber 58. Cut into base 83 are a plurality of circumferential grooves 86 with corresponding lands 87 between them. Cut into lands 87 are a plurality of parallel grooves 88 of small size. Head 84 is grooved as at 89 to form a plurality of circumferential grooves having parallel bases 90 with walls 91 at right angles thereto.

Fig. 6 discloses another embodiment of my novel jet which may be used in place of jet plate 63 and baffle plates 64 shown in Fig. 2. One or more jets 92 may be mounted in a common plate by screw threads 93 and this plate secured across chamber 58 by shoulder 62 as above described with reference to jet plate 63 and baffle plates 64. Jet 92 comprises a cylindrical body member 94 centrally bored as at 95 to form a cylindrical chamber extending the length of body 94. Body 94 is reduced in diameter as at 96 and threaded as at 97 to receive a base member 98 which is centrally bored as at 99 and communicates with chamber 95 through passage 100. The opposite end of body 94 is reduced in diameter as at 101 and threaded at 102 to receive a cap member 103. Cap 103 is ported as at 104. End 105 of body 94 is chambered at 106. A jet plate 107 is clamped between end 105 and cap 103. Jet plate 107 is chambered at 108. Chambers 106 and 108 are in communication through a plurality of small holes 109 let through jet plate 107. Positioned within chamber 95 are a plurality of ball members 110 separated from jet plate 107 by a spring 111. A screen 112 and a spring 113 are arranged between ball members 110 and the opposite end of chamber 95, the entire assembly within chamber 95 being free to move within chamber 95.

Suppose the embodiment of the present invention be set up as in Fig. 1 and suppose a mix in desired proportions of butter fat, powdered milk and water be place in tank 10. Then to put the device in operation conduit 33 leading to thermostatic switch 29 must be connected to a suitable source of electrical energy and the thermostatic switch 29 closed. After thermostatic switch 29 is closed motor 24 is started and agitators 28 are rotated to force the mix past heating coils 32. When thermostatic switch 29 is closed it closes the electrical circuit to heating coils 32 and the filaments therein start to heat. Agitation and heating of the mix is continued until the mix reaches a pasteurizing temperature of about 145°

F. As was stated above this temperature is reached after about one-half an hour. When this temperature is reached the temperature responsive fluid or gas in tube 30 expands and acts to open thermostatic switch 29 to break the electrical circuits to heating coils 32. When motor 24 is turned off and the circuit to heating coils 32 is broken the operator closes the electrical circuit to motor 46 and pump 41 is started. The action of pump 41 draws the pasteurized and stirred mix up through pipe 37 and the filter located in casing 39. From casing 39 the mix passes through pipe 44 into pump 41. From pump 41 the mix is forced under pressures up to 700 lbs. per square inch depending on the particle size desired through pipe 50 into casing 49. If the pressure forcing the mix into casing 49 is greater than the pressure for which the pressure responsive valve 53 is set valve 53 will open and a portion of the mix will be by-passed through pipe 52 to pipe 44 until the pressure in casing 49 is reduced to such an extent that valve 53 will close. For instance, if a coffee cream mix of from 20-22% butter fat is being emulsified, pressures from 200-240 lbs. per square inch may be used; or if a whipping cream mix of higher butter fat content and more than 32% is being emulsified, pressures from 25-100 lbs. per square inch may be used, while an ice cream mix of desired percentages of ingredients may require pressures up to 700 lbs. per square inch. This insures an almost constant controlled pressure in casing 49 and, as above described, a means for determining the particle size in the emulsion. Pressure in casing 49 is transmitted through end 54 to actuate the pressure gauge 56. The mix passes into end 57 of casing 49 and into chamber 58. From chamber 58 the mix is finely divided by being forced through the small holes 68 in jet plate 63. These holes 68 act to break up the mix, reduce particle size, and intimately associate the several components of the mix. From holes 68 the particles of the mix under pressure abruptly enter larger passages 69 where by reason of the pressure to which they are subjected and by reason of the compressive action of holes 68 the particles of the mix explode forming smaller particles and more intimately associating the components of the mix. From passages 69 the more intimately associated particles of the mix now reduced greatly in size pass to the corresponding passages 70 in the first baffle plate 64. When rotors 72 are used in passages 70 their squared ends 74 are positioned by the tapered portions 71 of passages 70. The mix under pressure flows through passages 70 until the rotors 72 are reached. Here the points 77 of rotors 72 act to divide the streams of the mix and force them to pass on both sides of the rotors 72. The mix passing off points 77 under pressure and through grooves 79 rotates the rotors 72 by reason of variations in the effective pressure of the mix acting at the sides thereof, or eddying of the mix, or both. Rotation of rotors 72 acts to more finely divide the particles of the mix by squeezing and crushing them between the curved sides 73 of the rotors 72 and the walls of the passages 70 with a consequent more intimate association of the particles of the mix. From rotors 72 the mix passes into tapered portions 71 of the passages 70 and from these portions of reduced area burst into the larger passages 70 of the next baffle plate with a further reduction in particle size for the reasons described with reference to passages 68 and 69. The second baffle plate acts as above described for the first baffle plate adjoining jet plate 63 to further reduce particle size and more intimately associate the components of the mix and so on down through the several baffle plates, it now being apparent that the number of baffle plates used and the pressure to which the mix is subjected determine the particle size in the emulsion.

From the last of baffle plates 64 the finely divided intimately associated particles of the emulsion pass through cap 60 into pipe 61, through joint 62 into tank 63. From tank 63 the emulsion passes through cooling coils 65 which reduce the temperature of the emulsion from approximately 145° F. to approximately 40° F. From cooling coils 65 the cooled emulsion is led through pipe 66 to any appropriate container 67. To insure a complete cooling of the emulsion in the container 67 it has been found expedient to remove container 67 to a cool atmosphere and there thoroughly stir the emulsion after it has been in the container 67 about one hour.

If the preliminary breaker 80 shown in Fig. 3 is used in the embodiment of my novel jets shown in Fig. 2 it is placed as described in chamber 58 with its base 81 adjacent jet plate 63 and its point 82 extending into coupling 49. The mix under pressure from pump 41 then first impinges upon point 82 which acts to divide the flow of the mix and pass it over the entire surface of the cone 84. The mix separated by point 82 then flows into grooves 89 where the action of the right angled edges of bases 90 and walls 91 act to divide the mix into thin sheets and to break up the larger particles. From the groove 89 next to base 83 the mix flows in a thin sheet to the front edge of the first land 87. Here the thin sheet of mix is divided and forced through the small grooves 88 in land 87 which tend to compress and decrease the particle size. From grooves 88 the compressed particles burst under pressure into the first of grooves 86 where they explode due to the release of compression and to the pressure to which they are subjected and form smaller more intimately associated particles in the mix. From the first of grooves 86 the mix is forced through grooves 88 in the second land 87 and from these grooves the particles under pressure burst into the second of grooves 86 where they again explode to form smaller particles more intimately associated in the mix and so on through the several lands 87 and grooves 86 with a resulting smaller particle size and more intimate association of the particles in the mix until the mix leaves the last of lands 87 and enters the small holes 68 in jet plate 63 where further diminution in size of the particles and more intimate association occurs as above described.

If my novel jet 92, as described with reference to Fig. 6, is used in place of jet plate 63 and baffle plates 64 then, as described, one or more of jets 92 may be screwed into an appropriate plate at their bases 93 and the plate clamped to the end of chamber 58 by the shoulders 62 of sleeve 59. The mix in chamber 58 will then pass under pressure into chambers 99 let into bases 93 of the jets 92. From chambers 99 the particles of the mix will be compressed as they are forced under pressure through the passages 100 of reduced diameter. The particles of the mix pass through passages 100 and burst into cylindrical chamber 95 of larger diameter where they explode due to release of the compression to which they had been subjected in passage 100 and a mix of smaller and more intimately associated particles results. The mix is then forced under pressure past spring 113 which, due to its corkscrew shape, tends to divide the mix into thin sheets and further reduce particle size. From spring 113 the particles of the mix are forced through screen 112 which in turn further reduces particle size and more intimately associates the components of the mix. From screen 112 the mix flows over the surface of the first of ball members 110 until it reaches the point where the ball member 110 slidingly engages the surface of cylindrical chamber 95 at which point the particles of the mix are subjected to a grinding between the ball member 110 and the surface of cylindrical chamber 95 as ball member 110 oscillates or rotates therein with further reduction in size of the particles. Oscillation or rotation of ball members 110 is caused by small pressure variations in the pressure of the mix which either forces ball members 110 against spring 111 and compresses it or which allows compressed spring 111 to expand and move ball members 110 in the opposite direction. From the first of ball members 110 the mix flows over the sides of the second ball member 110 and the particles of the mix are further reduced in size and so on until the last of ball members 110 is passed. The mix then flows over spring 111 which further acts to divide the mix and reduce the particles to smaller sizes. From spring 111 the mix passes into chamber 106 and from there is forced through jet plate 107. The small holes in jet plate 107 act to compress the particles of the mix and the pressure to which they are subjected forces them through these holes from which they burst into chamber 109 where the particles explode into small sizes due to the release of compression to which they had been subjected. From chamber 109 the emulsion is forced through ports 104 and may be conducted away to a cooler as described above.

From the above it will be apparent that the present invention provides an emulsor by which the particle size in the emulsion may be regulated and homogenized; which will reconstruct milk and cream products from butter, powdered milk and water; which will pasteurize the mix by direct heating of an electric coil; by which the percentages of the components of the emulsion may be controlled; which is simple in design, compact, of uniform operation, of minimum of moving parts, and easily dismounted for cleaning and sterilizing.

It will be apparent to those skilled in the art that changes may be made in the above described embodiments of the present invention without departing from the inventive concept thereof. For instance, a pilot light may be provided on the thermostatic switch 29 to indicate when the switch is closed; or a separate heating coil may be provided to heat the water of the mix before the addition of the other components of the emulsion or to heat the air above the mix while the mix is being heated and stirred. While this invention has been described with reference to its use for recombining milk products from the several components of whole milk, such use is for the purpose of description only and in no way acts to limit the scope of the present invention. To determine the scope of the present invention reference should therefore be had to the appended claims.

What is claimed is:

1. In an emulsor, a jet assembly including a jet plate having therein a plurality of small holes of enlarged diameter at the outlet ends thereof and one or more baffle plates arranged adjacent said jet plate at the outlet side thereof, each of said baffle plates having holes of larger diameter than the enlarged diameter of the holes in said jet plate arranged opposite the respective holes in said jet plate and terminating at their outlet ends in constricted openings.

2. In an emulsor, a jet assembly including a preliminary breaker comprising a cylindrical base and conical top, said top having therein rectangular grooves whose sides are respectively parallel and perpendicular to the base of said breaker, said base being circumferentially grooved with small grooves in the lands therebetween at right angles to edges of said circumferential grooves, and a jet plate adjacent the base of said preliminary breaker having therein a plurality of small holes of enlarged diameter at the outlet ends thereof.

JAMES BURTON HAYES.